(12) United States Patent
Laufer et al.

(10) Patent No.: US 6,909,896 B2
(45) Date of Patent: Jun. 21, 2005

(54) APPARATUS AND METHOD FOR TWO-WAY DATA COMMUNICATION VIA SATELLITE

(75) Inventors: Shaul Laufer, Petach Tikva (IL); Arie Reichman, Kfar-Saba (IL)

(73) Assignee: Shiron Satellite Communications (1996) Ltd., Petach Tikva (IL)

( * ) Notice: Subject to any disclaimer, the term of this patent is extended or adjusted under 35 U.S.C. 154(b) by 487 days.

(21) Appl. No.: 09/811,593

(22) Filed: Mar. 20, 2001

(65) Prior Publication Data

US 2002/0137509 A1 Sep. 26, 2002

(51) Int. Cl.⁷ .................................................. H04Q 7/20
(52) U.S. Cl. ..................... 455/427; 455/12.1; 455/428; 455/13.2; 342/357.15
(58) Field of Search ................................ 455/427, 3.02, 455/3.04, 3.05, 428, 430, 3.06, 13.2–3, 12.1, 98, 13.3; 342/357.09, 357.1, 357.15; 310/316

(56) References Cited

U.S. PATENT DOCUMENTS

| | | | | |
|---|---|---|---|---|
| 5,708,963 A | * | 1/1998 | Mobley et al. | 455/12.1 |
| 5,887,257 A | * | 3/1999 | Olds | 455/427 |
| 5,991,596 A | * | 11/1999 | Cunningham et al. | 455/12.1 |
| 6,047,161 A | * | 4/2000 | Sowles et al. | 455/12.1 |
| 6,078,810 A | * | 6/2000 | Olds et al. | 455/428 |
| 6,088,571 A | * | 7/2000 | Kane et al. | 455/12.1 |
| 6,105,060 A | * | 8/2000 | Rothblatt | 709/219 |
| 6,208,625 B1 | * | 3/2001 | Zancho et al. | 370/316 |
| 6,339,707 B1 | * | 1/2002 | Wainfan et al. | 455/427 |
| 6,377,981 B1 | * | 4/2002 | Ollikainen et al. | 709/217 |
| 6,388,606 B1 | * | 5/2002 | Keydel et al. | 342/25 |
| 6,449,263 B2 | * | 9/2002 | Harris et al. | 370/316 |
| 6,522,658 B1 | * | 2/2003 | Roccanova | 370/441 |
| 6,661,996 B1 | * | 12/2003 | Wiedeman et al. | 455/12.1 |
| 6,690,934 B1 | * | 2/2004 | Conrad et al. | 455/427 |
| 6,751,452 B1 | * | 6/2004 | Kupczyk et al. | 455/345 |
| 6,836,726 B2 | * | 12/2004 | Sanchez Peiro | 701/207 |
| 2002/0072360 A1 | * | 6/2002 | Chang et al. | 455/427 |
| 2002/0073167 A1 | * | 6/2002 | Powell et al. | 709/217 |
| 2002/0188950 A1 | * | 12/2002 | Soloff et al. | 725/63 |
| 2003/0073436 A1 | * | 4/2003 | Karabinis et al. | 455/429 |
| 2003/0154310 A1 | * | 8/2003 | David | 709/249 |

* cited by examiner

*Primary Examiner*—Cong Van Tran
(74) *Attorney, Agent, or Firm*—G.E. Ehrlich (1995) Ltd.

(57) ABSTRACT

Two-way data communication via satellite, using data communication in a first direction via satellites in geostationary orbit, and a data communication in a second direction via satellites in a below geostationary orbit, either MEO or LEO. The transceiver is particularly useful for providing Internet connections Preferably, a LEO forward link may be used for control signaling, urgent data traffic and the like.

18 Claims, 4 Drawing Sheets

APPARATUS AND METHOD FOR TWO-WAY DATA COMMUNICATION VIA SATELLITE

FIELD OF THE INVENTION

The present invention relates to an apparatus and method for two-way data communication via satellite and more particularly but not exclusively to an apparatus and method especially suitable for providing Internet links.

BACKGROUND OF THE INVENTION

Geostationary earth orbit (GEO) is 22,282 miles above the equator. The orbit is important because it allows a satellite to orbit the earth at a fixed location in relation to the earth. From GEO, three satellites can cover all of the earth's surface excluding the polar regions, and transmissions can be received through fixed antennas. Once an antenna has been correctly aligned with the satellite, no further tracking issues arise since the satellite remains in the same relative position.

Transmissions via GEO are subject to a delay which is noticeable particularly in respect of voice communication. A relatively large amount of transmission power is needed due to the long distances involved and a large dish may be required for sending and receiving, especially to achieve high data rates.

Systems are also in place for placing satellites in lower orbits. The lower orbits may be categorized in two groups, low earth orbit (LEO) and medium earth orbit (MEO). LEO communication systems are based on a constellation of small low earth orbiting satellites orbiting in the range of 500 miles above the earth. The constellation is preferably sufficiently large to provide global coverage in that every position on the earth's surface is in site of one of the satellites at any given time. Systems, such as Iridium, ICO, Globalstar, Teledesic and Skybridge have been available providing two-way links via LEO, some of which can support Internet communication, but these have been notable for lack of commercial success. The only system currently operating commercially is Globalstar which is narrowband and currently used mainly for voice. ICO is being redesigned for packet communication with data rates of up to 144 kbs and Skybridge is designed for high data rates.

Skybridge and Globalstar both use transparent transponders and communication is controlled by a network of terrestrial gateways.

The advantages of LEO include no discernable time delay in communication and the absence of the need for heavy transmission power or a large receiver dish. More generally it provides a better trade off between antenna size, transmitter power and data rate than does a GEO based system.

The disadvantages of LEO based systems in general are that a steerable antenna is needed, at least for high data rates, and the available bandwidth is relatively narrow, particularly at L band frequencies and particularly with the ICO and Global Star systems.

MEO covers orbital heights in between GEO and LEO and provides a compromise between the advantages and disadvantages of each.

Increasingly, GEO-based satellite communications systems are being made to be compliant with the International DVB standard, principally intended for digital television broadcasting but now also embracing the Internet communication protocol TCP/IP. The DVB standard is based on the common MPEG-2 coding system and is designed to produce signals which are easily transferable from one medium to another, frequently needed in today's complex signal distribution environment. DVB signals move easily and inexpensively from satellite to cable, from cable to terrestrial radio and to the telephone network. A part of the DVB standard specifically for satellite forward link (to the user) is known as DVB-S and for satellite return link (from the user) is known as DVB-RCS.

Essentially, thanks to the use of MPEG-2 packets as the principle data carrier, and the way in which control information is arranged therein, DVB can deliver almost anything that can be digitized, including High Definition TV, multiple channel Standard definition TV (PAL/NTSC or SECAM), broadband multimedia data and interactive services.

GEO based systems comprise much equipment which is DVB-S compliant and thus it is desirable to use GEO for data communication. On the other hand two-way data communication requires a return channel, from the remote user back to the network. Often the remote channel is very lightly used. Most Internet users download the vast majority of their data from the network and upload relatively little. Use of GEO for the return channel requires a significant transmission capability which may not be regarded as justified for the amount of traffic involved.

Thus a system has been proposed in which GEO provides the link from the Internet to a remote user but a return link is provided via telephone. The solution however may require paying connection charges for two links, the telephone return channel may be slow and telephone lines are not universally available.

SUMMARY OF THE INVENTION

According to a first aspect of the present invention there is thus provided a transceiver for two-way data communication via satellite, the transceiver comprising a forward link manager for managing data communication in a first direction via satellites in geostationary orbit, and a return link manager for managing data communication in a second direction via satellites in a below geostationary orbit.

In one embodiment, a hub is used to manage the link via geostationary orbit and the hub is connected to the below geostationary orbit communication system, either directly or via a network.

Preferably, the forward link manager is additionally able to manage data communication in said first direction via satellites in said below geostationary orbit.

Preferably, the forward link manager comprises a selector for selecting between satellites in geostationary orbit and satellites in below geostationary orbit based on a content type of the data to be transmitted.

Preferably, the selector is operable to select satellites in below geostationary orbit for data having content types including any one of a group comprising voice, messaging, and control signaling, and selecting satellites in geostationary orbit for data having other content types.

Reference in the above to satellites in below geostationary orbit includes satellites in medium earth orbit and satellites in low earth orbit.

A preferred embodiment is operable to transmit and receive data using the Internet Protocol.

Such a transceiver is preferably operable to maintain an Internet link.

Preferably, the above referred to first direction is a generally data heavy direction and said second direction is a generally data light direction.

According to a second aspect of the present invention there is provided an electronic terminal associated with a two-way satellite transceiver for connecting said terminal to an electronic network, the transceiver comprising a receiver for receiving data via a connection to a satellite in geostationary orbit and a transmitter for sending data via a satellite in a lower than geostationary orbit. The terminal may be located at a user premises and the transceiver may be located likewise at the user premises. Alternatively the transceiver may be located remotely from the user and may serve a plurality of users via a local area network. The transceiver may typically be part of a remote gateway in a GEO-based link system.

Preferably, the receiver is additionally operable to receive data via satellites in said below geostationary orbit.

According to a third aspect of the present invention there is provided a method of maintaining a data link from an electronic network to a remote terminal, the method comprising sending data to said remote terminal via at least one satellite in geostationary orbit, and receiving data from said terminal via at least one satellite in a lower than geostationary orbit.

Preferably the method further comprises sending data having a predetermined data type to said remote terminal via said at least one satellite in a lower than geostationary orbit.

Preferably, said predetermined data type includes at least voice, messaging and control signaling.

Preferably, satellites in below geostationary orbit comprise satellites in medium earth orbit and satellites in low earth orbit.

Preferably, sending and receiving of data is carried out using the Internet Protocol.

According to a fourth aspect of the present invention there is provided a method of maintaining a data link from a terminal to a remote electronic network, the method comprising receiving data from said remote electronic network via at least one satellite in geostationary orbit, and sending data to said remote electronic network via at least one satellite in a lower than geostationary orbit.

Preferably, satellites in below geostationary orbit comprise satellites in medium earth orbit and satellites in low earth orbit.

Preferably, sending and receiving of data is carried out using the Internet Protocol.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DESCRIPTION OF THE PREFERRED EMBODIMENTS

Figure 1:
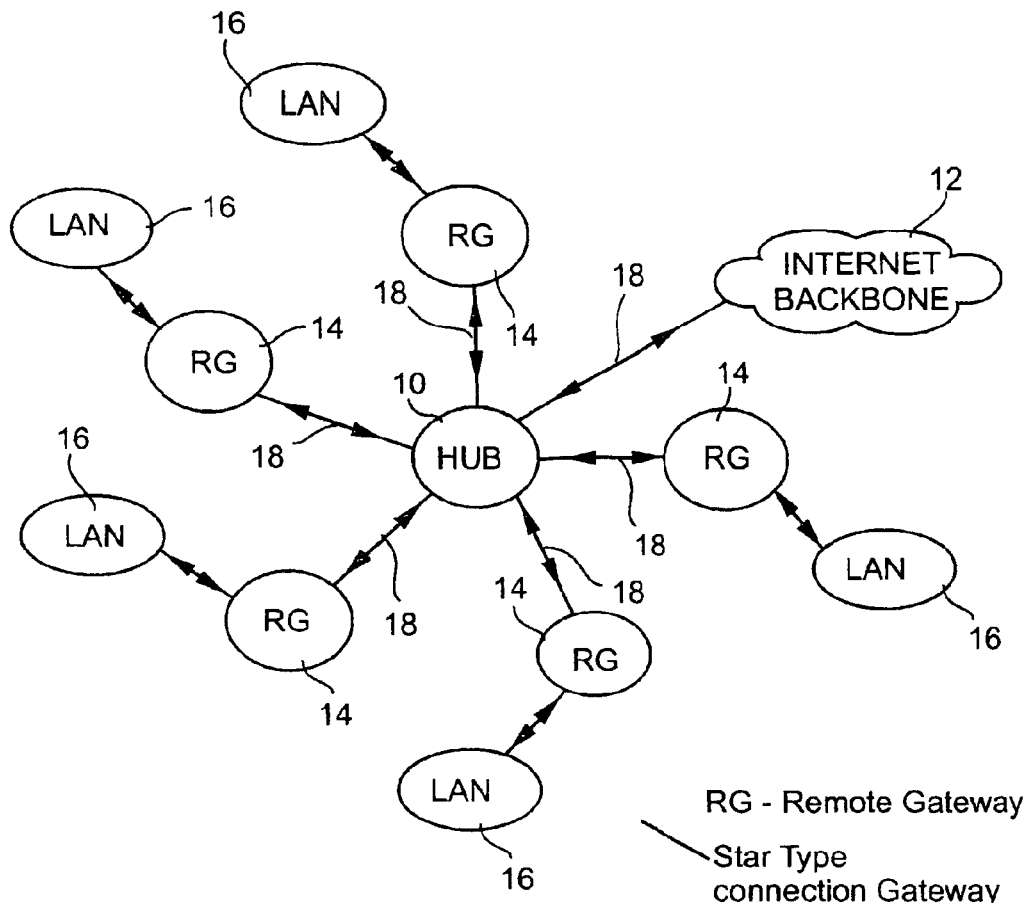
FIG. 1 is a generalized diagram of a known star-connected bi-directional satellite link to the Internet using GEO satellites.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Reference is now made to FIG. 1, which is a simplified diagram showing a star connected two-way communication link using satellite. In the diagram a central hub 10 is connected to the Internet backbone indicated by reference numeral 12. In this specification, references to the Internet backbone are to core high capacity trunk sections that carry large amounts of Internet data, as distinct from peripheral lower capacity elements. The hub 10 is star connected to a series of remote gateways 14 each connected to a respective LAN 16 on which local subscribers may be accommodated.

The hub 10 is preferably connected to each remote gateway 14 via two-way satellite links 18. Each satellite link 18 is bi-directional, meaning that it comprises a forward link from the transmitter to the satellite and a return link from the satellite to the receiver, the bi-directional link being towards both the hub 10 and the remote gateway 14. The satellite links are conventionally provided via GEO satellites.

The hub 10 preferably serves as a system control center providing access to the Internet backbone 12 for each of the remote gateways 14 so that users on each LAN may be connected via the HUB interactively to the Internet.

Figure 2:
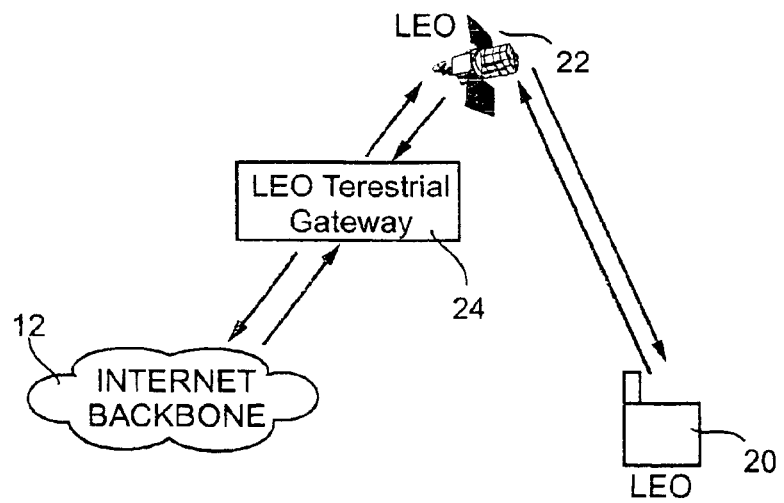
FIG. 2 is a generalized diagram of a known bi-directional satellite link to the Internet via a LEO satellite link.

Reference is now made to FIG. 2, which is a simplified diagram showing a prior art system in which the satellite link of FIG. 1 is provided by a LEO system. In FIG. 2 a LEO consumer 20 is connected via a two way link to a LEO satellite 22. The LEO consumer 20 may be an individual user. The satellite is connected to a LEO terrestrial gateway 24 which fulfils the functions of the hub of FIG. 1. The terrestrial gateway 24 is connected to the Internet backbone 12 so as to provide a full interactive Internet link.

Figure 3:
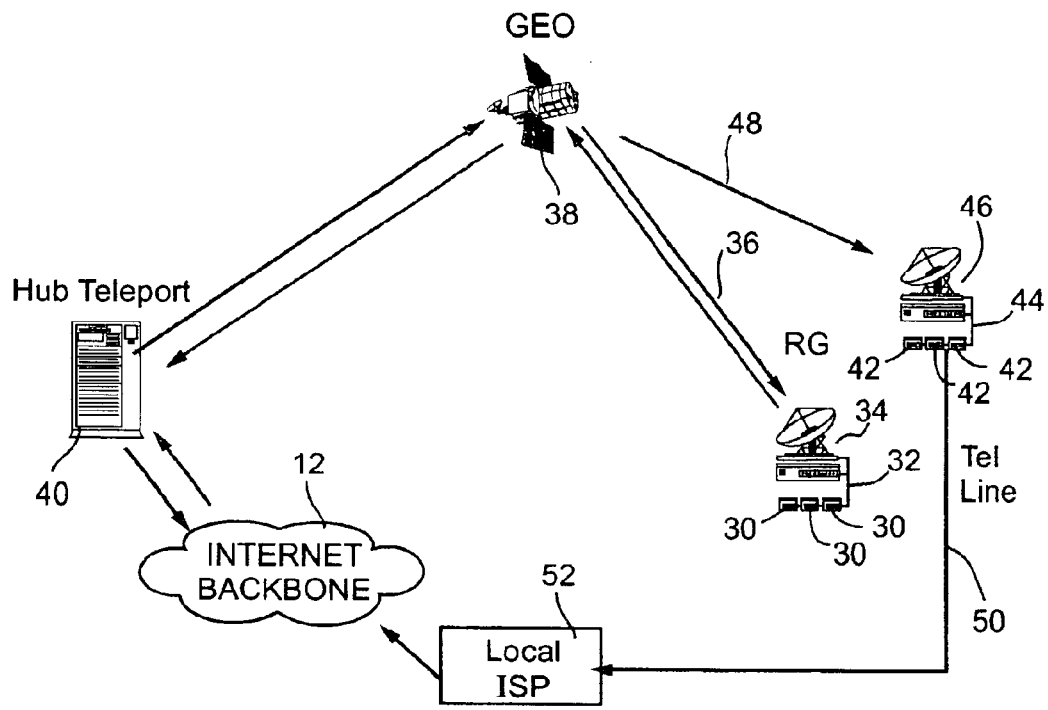
FIG. 3 is a generalized diagram of two different types of known bi-directional satellite links via GEO satellites to the Internet, one being two way via satellite and the other being hybrid satellite/phone line.

Reference is now made to FIG. 3, which is a simplified diagram showing two types of prior art bi-directional connections using GEO satellites. A first type of connection is of the type illustrated in FIG. 1, in which individual users 30 are connected via a LAN 32 to a remote gateway 34. The remote gateway is connected via a bi-directional satellite link 36 to a GEO satellite 38 which is itself connected via a bi-directional link to a hub 40. The hub 40 is connected, again via a bi-directional link, to the Internet backbone 12. Thus a bi-directional link is provided via GEO.

In the second type of connection, the hybrid GEO/phone line, shown in FIG. 3, users 42 are likewise connected via a LAN 44 to a remote gateway 46 but this time are connected via only a unidirectional link 48 to the GEO satellite 38 and thence to the Internet backbone 12 via the hub 40. The unidirectional link 48 is for sending data from the Internet 12 towards the user 42. For the return link, the users make use of a telephone line 50 and a conventional ISP 52.

Figure 4:
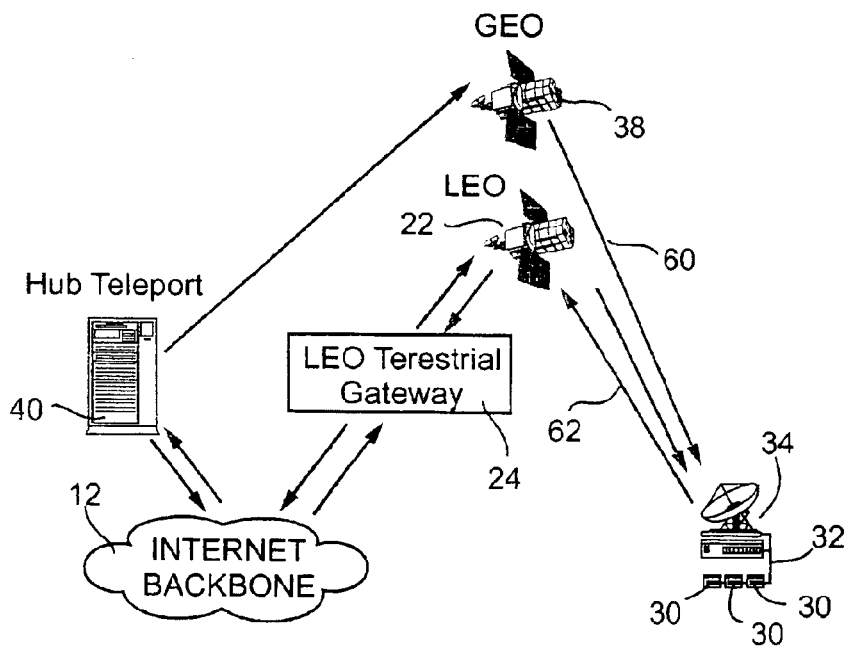
FIG. 4 is a simplified diagram of a hybrid bi-directional Internet link via satellite, specifically a hybrid GEO satellite/LEO satellite link

Reference is now made to FIG. 4, which shows a bi-directional satellite based communication link in accordance with a first embodiment of the present invention. Parts that are identical to those shown above are given the same reference numerals and are not referred to again except as necessary for an understanding of the present embodiment. In the embodiment of FIG. 4, the user 30 is connected via a LAN 32 to a remote gateway 34 as in FIG. 3. The remote gateway is linked through a GEO satellite 38 via a unidirectional forward link 60 operative to send data from the Internet to the user 30. A return link 62 is preferably provided via a LEO satellite 22 (or as convenient via a MEO satellite) and a LEO terrestrial gateway 24. The link thus takes advantage of the more developed and high capacity GEO based systems for the data heavy forward link whilst using the cheaper and more convenient LEO for the return link. In particular the transmitter power for the return link is smaller as is the antenna size.

In a preferred embodiment, the connection via LEO also incorporates a forward link 64. As mentioned above, one of the disadvantages of GEO is a noticeable time delay. Certain types of data are more time critical than others and it is advantageous to send them via LEO thereby saving on the delay. This may be achieved by identifying, perhaps from the packet headers, alternatively by notification from the sender, what type of data is being sent. For example voice data from Internet telephony, messaging and control signaling are types of data where it may be desirable to avoid the introduction of a delay.

In general, a LEO link is bi-directional, so the LEO forward link is available automatically. It is therefore convenient to use the LEO forward link for establishing the initial connection, that is to say, to allocate a LEO bi-directional and a GEO forward link connection. During an initial phase of link establishment, a LEO connection is preferably established using a standard procedure. Then, a return link becomes accessable via a random access mode and replies may be sent via a service type line. For voice, as well as for control signaling and for fast and short messaging, it is simpler to use the LEO two way link.

Figure 5:
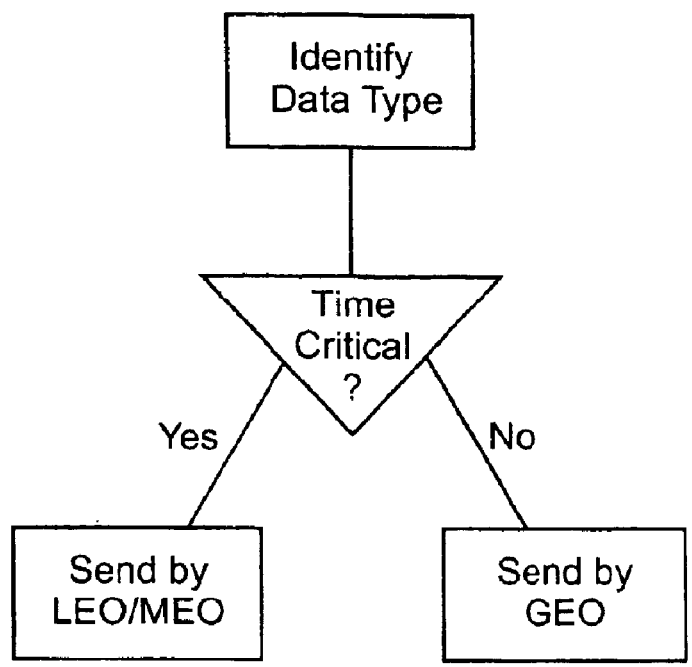
FIG. 5 is a simplified flow chart illustrating the sorting of data for sending via available types of forward link.

Reference is now made to FIG. 5, which is a simplified flow diagram showing how data may be selected for sending via the two different forward links. The data type is first identified, as described above. Then a decision is made as to whether the data is time critical. It is pointed out that in the preferred embodiment, what is important is relative time, not absolute time. In general, real time multimedia is considered as time critical because the picture has to arrive together with the sound. In the present embodiment however, real time multimedia would be sent via the GEO link because what is important is the relative time. It is important that the sound arrives in sequence with the pictures, which the GEO link is best at doing. By contrast, voice is best sent by the LEO connection because the absolute delay introduced by the GEO link would otherwise disturb the flow of the conversation.

Figure 6:
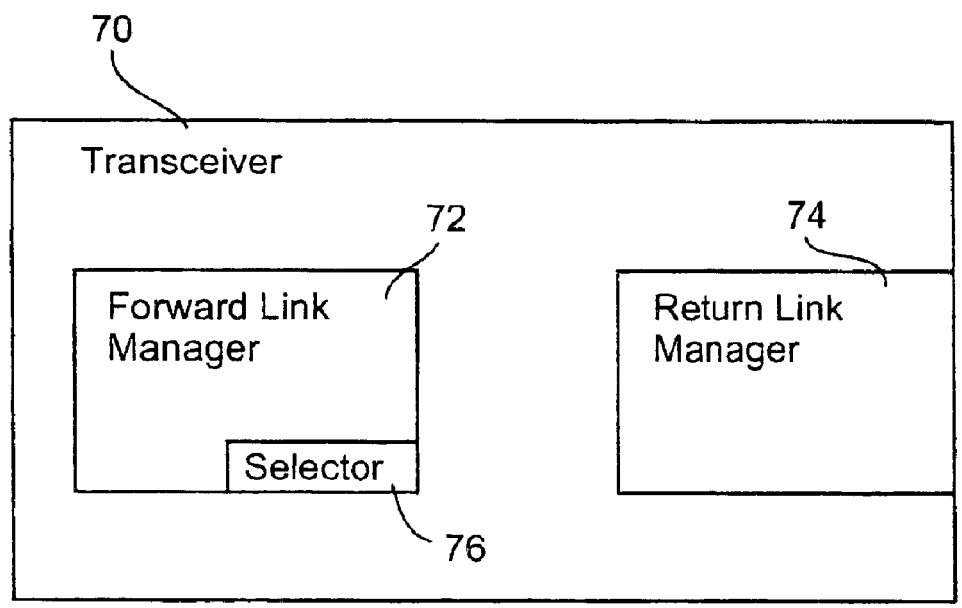
FIG. 6 is a simplified diagram showing a transceiver for use in a preferred embodiment of the present invention.

Reference is now made to FIG. 6, which is a generalized block diagram showing a transceiver 70 for use as part of the hub 10, or as part of the remote gateway 34 for maintaining an Internet link, according to a preferred embodiment of the present invention. The transceiver 70 preferably comprises an forward link manager 72 for managing data communication in a forward link direction via satellites in geostationary orbit, and a return link manager 74 for managing data communication in a return link direction via satellites in a below geostationary orbit, including both MEO and LEO systems.

Preferably, the forward link manager 72 is additionally able to manage data communication in the forward link direction via the MEO or LEO satellites. A selector 76 is preferably provided for selecting between satellites in geostationary orbit and satellites in below geostationary orbit based on a content type of the data to be transmitted. Preferably, the selector is operable to select satellites in below geostationary orbit for data having particular content for example, voice, messaging, and control signaling, and selecting satellites in geostationary orbit for data having other content types. In the example given, in which the transceiver is used for maintaining Internet links, the transceiver is operable to transmit and receive data using the Internet Protocol.

Figure 7:
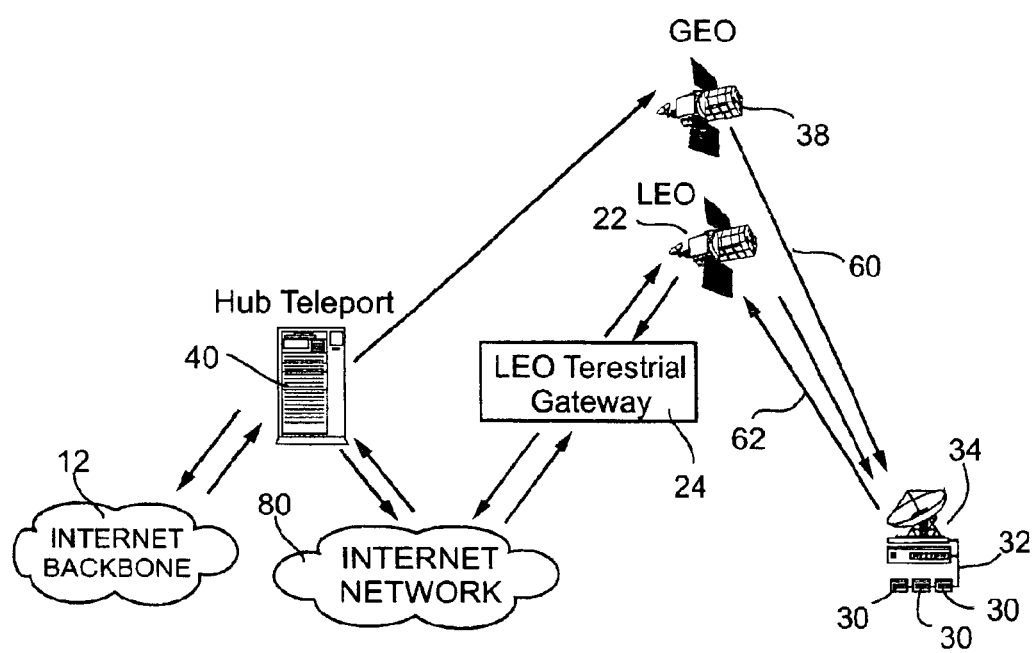
FIG. 7 is a simplified diagram showing an interface for connecting the LEO system to a GEO hub.

Reference is now made to FIG. 7, which is a further embodiment of the present invention in which the LEO link is not directly linked to the Internet backbone 12. Parts that are identical to those shown above are given the same reference numerals and are not referred to again except as necessary for an understanding of the present embodiment. In FIG. 7, the LEO terrestrial gateway 24 is connected to the Hub teleport 40 via an interface network 80. The interface network 80 may for example be a backbone network of the LEO system.

Thus, there is provided a bi-directional data link which makes use of GEO for a data heavy direction and LEO or MEO for a data light direction and which is thus able to make use of the relative advantages of both of the types of satellite connection.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

We claim:

1. A transceiver for two-way data communication via satellite, the transceiver comprising
a forward link manager for managing data communication in a first direction via satellites in geostationary orbit, and
a return link manager for managing data communication in a second direction via satellites in a below geostationary orbit
wherein said forward link manager is additionally operable to manage an Internet backbone link to manage media-content data communication of data having a data content type, in said first direction via satellites in said below geostationary orbit.

2. A transceiver according to claim 1, wherein said forward link manager comprises a selector for selecting between satellites in geostationary orbit and satellites in below geostationary orbit based on a content type of the data to be transmitted.

3. A transceiver according to claim 1, wherein said selector is operable to select satellites in below geostationary orbit for data having content types including any one of a group comprising voice, messaging, and control signaling, and selecting satellites in geostationary orbit for data having other content types.

4. A transceiver according to claim 1 wherein satellites in below geostationary orbit comprise satellites in medium earth orbit and satellites in low earth orbit.

5. A transceiver according to claim 1, further operable to transmit and receive data using the Internet Protocol.

6. A transceiver according to claim 1, wherein said first direction is a generally data heavy direction and said second direction is a generally data light direction.

7. An electronic terminal associated with a two-way satellite transceiver for connecting said terminal to an electronic network, the transceiver comprising a receiver for receiving data via a connection to a satellite in geostationary orbit and a transmitter for sending data via a satellite in a lower than geostationary orbit, wherein said receiver is additionally operable to receive media content data having a data content type via satellites in said below geostationary orbit and wherein said terminal is further operatively associated with an internet backbone connection to render data to be received to be available via both said geostationary and lower than geostationary orbit satelites.

8. An electronic terminal according to claim 7, wherein satellites in below geostationary orbit comprise satellites in medium earth orbit and satellites in low earth orbit.

9. An electronic terminal according to claim 7, wherein said transceiver is operable to transmit and receive data using the Internet Protocol.

10. A method of maintaining a data link from an electronic network to a remote terminal, the method comprising:
sending data to said remote terminal via at least one satellite in geostationary orbit,
using an internet backbone link, additionally sending media content data having a predetermined media content data type to said remote terminal via at least one satellite in a lower than geostationary orbit, and
receiving data from said terminal via said at least one satellite in a lower than geostationary orbit.

11. A method according to claim 10 wherein said predetermined data type includes at least voice, messaging and control signaling.

12. A method according to claim 10, wherein satellites in below geostationary orbit comprise satellites in medium earth orbit and satellites in low earth orbit.

13. A method according to claim 10, wherein sending and receiving of data is carried out using the Internet Protocol.

14. A method of maintaining a data link from a terminal to a remote electronic network, the method comprising:
at said terminal receiving data from said remote electronic network via at least one satellite in geostationary orbit,
providing a data link from an infrastructure of said at least one satellite in geostationary orbit to an infrastructure of a satellite in lower than geostationary orbit,
at said terminal further receiving media content data having a predetermined media content data type from said remote electronic network via at least one satellite in a lower than geostationary orbit and said data link, and
from said terminal sending data to said remote electronic network via said at least one satellite in a lower than geostationary orbit.

15. A method according to claim 14, wherein satellites in below geostationary orbit comprise satellites in medium earth orbit and satellites in low earth orbit.

16. A method according to claim 14, wherein sending and receiving of data is carried out using the Internet Protocol.

17. A method according to claim 14, wherein said predetermined data type includes at least voice, messaging and control signaling.

18. A method of maintaining a data link from an electronic network to a remote terminal, the method comprising:
sending data to said remote terminal via at least one satellite in geostationary orbit, and
using an internet backbone link, receiving media content data having a media content data type from said terminal via said at least one satellite in a lower than geostationary orbit.

* * * * *